United States Patent [19]

Hofstein

[11] 3,798,633

[45] Mar. 19, 1974

[54] DATA STORAGE AND DISPLAY SYSTEM

[75] Inventor: Steven R. Hofstein, Princeton, N.J.

[73] Assignee: Princeton Electronic Products, Inc., North Brunswick, N.J.

[22] Filed: June 29, 1972

[21] Appl. No.: 267,378

Related U.S. Application Data

[63] Continuation-in-part of Ser. No. 9,752, Feb. 9, 1970, abandoned.

[52] U.S. Cl. ................ 340/324 A, 315/8.5, 315/12, 328/123, 340/173 CR

[51] Int. Cl. ............................................ G08b 5/36

[58] Field of Search ........... 315/8.5, 9, 12; 328/123, 328/124; 340/173 CR, 324 AD

[56] References Cited

UNITED STATES PATENTS 3,426,236 2/1969 Mepham .............................. 315/12

3,641,555 2/1972 Griffin.......................... 340/324 AD

*Primary Examiner*—David L. Trafton

*Attorney, Agent, or Firm*—Samuelson & Jacob

[57] ABSTRACT

A storage and display system for alphanumeric information or the like utilizing a storage tube, the target of which includes separate storage areas for character configuration and character digital data. Characters are written in common form in the first of said areas which is read and transferred to a visual display and in digital form in the second of said areas which is read and transferred to information storage or utilization means. There is a direct correlation between the information stored in the two areas.

8 Claims, 3 Drawing Figures

DATA STORAGE AND DISPLAY SYSTEM

This is a continuation-in-part of application Ser. No. 9,752, filed Feb. 9, 1970, now abandoned.

This invention relates generally to information storage and display systems, and more specifically relates to systems of this type utilizing an electronic storage tube for storing patterns of information for display on a cathode ray tube or the like.

In various electronic display systems an electronic storage tube may be used to provide a storage site for a generated message format. In a typical such system, for example, a sequence of alphanumeric characters, representative of a message or the like, is written onto the target of the tube by modulating the electron beam in the tube envelope with signals provided by a character generator. The message may, for example, represent data generated by a computer in response to an inquiry; or the message may simply represent the inquiry itself made of the computer. Visual display in such a system is achieved by scanning the message previously written on the storage tube target with the electron beam, and using the thereby derived signal from the tube target to modulate a CRT in the display portion of the system. Especially where the storage tube utilizes a target such as disclosed in my copending patent application Ser. No. 840,698, filed July 10, 1969, now U. S. Pat. No. 3,621,294, issued Dec. 28, 1971, such scanning may be repeated over a sustained period of time, whereby the display on the CRT may be rendered continuous.

In those instances in which display systems of the foregoing type are part of a computer terminal installation which are connected to a computer over a telephone line, for example, and use the computer on a time sharing basis, it is useful to be able to store the digital information as well as the alphanumeric visual information. That is to say that situations frequently arise where in addition to displaying data flowing from a computer or the like, one wishes, as well, to retain the generated message in some usable but easily retrievable form. In the usual operation, the message may appear on the cathode ray tube screen in visual alphanumeric language after having been stored on the storage tube screen. This visual display is not in a form which can be identified by the computer. Generally, the prior art systems store the analogy of the visual display in the computer memory bank in digital form. Whenever, the terminal operator alters or otherwise edits a visual message in a prior art system, the changed information must be fed back to the computer for storage of the new information. As a consequence, the terminal must remain connected to the computer during the editing operation. This increases the on-line connection time between the terminal and the computer.

Saving in on-line time and more economical and efficient use of a computer may be achieved by use of means to maintain the material in digital form at the terminal so that the operator may alter or otherwise edit the material in both visual and digital form. Then, when the material has been edited, as desired, the operator may reconnect the terminal to the computer and feed the edited material, in digital form, back to the computer for storage. This may be referred to as "dumping" and may be accomplished by actuation of a single key on the terminal keyboard. The foregoing may be accomplished by maintaining a digital memory at the terminal. However, it is better to accomplish this by means of the present invention wherein the visual alphanumeric information is stored on the storage tube target and read out onto the cathode ray tube and another portion or portions of the storage tube target is used to store the digital information corresponding to the alphanumeric display.

The digital data is stored on an area of the storage tube target which is not normally scanned to produce the visual alphanumeric data in common form. I prefer to designate this area of the storage tube target as an "off-screen" area. These off-screen areas may be located in various areas of the target such as around the periphery thereof. Similarly, I prefer to designate the area of the target which is read out and transferred to a CRT for visual display as an "on-screen" area.

In accordance with the foregoing, it may be regarded as an object of the present invention, to provide an information storage and display system enabling in a simple, expeditious manner, visual display of alphanumeric or like data and storage of corresponding digital data.

It is a further object of the invention to provide an information storage and display system wherein message composition is accomplished in a single portion of the system for both a digitally encoded and a configuration form of said message.

Now in accordance with the present invention, the foregoing objects, and others as will become apparent in the course of the ensuing specification, are achieved through use of a storage and display system incorporating a storage tube, the target of which includes separate storage areas for character configuration and character digital data. The system is linked to a computer or other source of character data, and under direction of a suitable control, data from said computer is written in the specified areas of the target in accordance with the nature of the data. In one embodiment of the invention, the digital and character configuration areas are positioned one directly below the other whereby beam positioning for writing of a character in say its digital form, may be simply accomplished by modifying the deflection voltage previously used for writing the character in configuration form by a simple dividing factor. The sequence of character data thus written in the cited areas of the storage tube target may thereafter,—in the case of configuration data—be used to modulate a display on a CRT, or—in the case of the digital data—be retransmitted to the computer storage or transferred to a magnetic tape or other digital data storage means.

The invention is diagrammatically illustrated, by way of example in the appended drawings, in which.

Figures 1, 2:
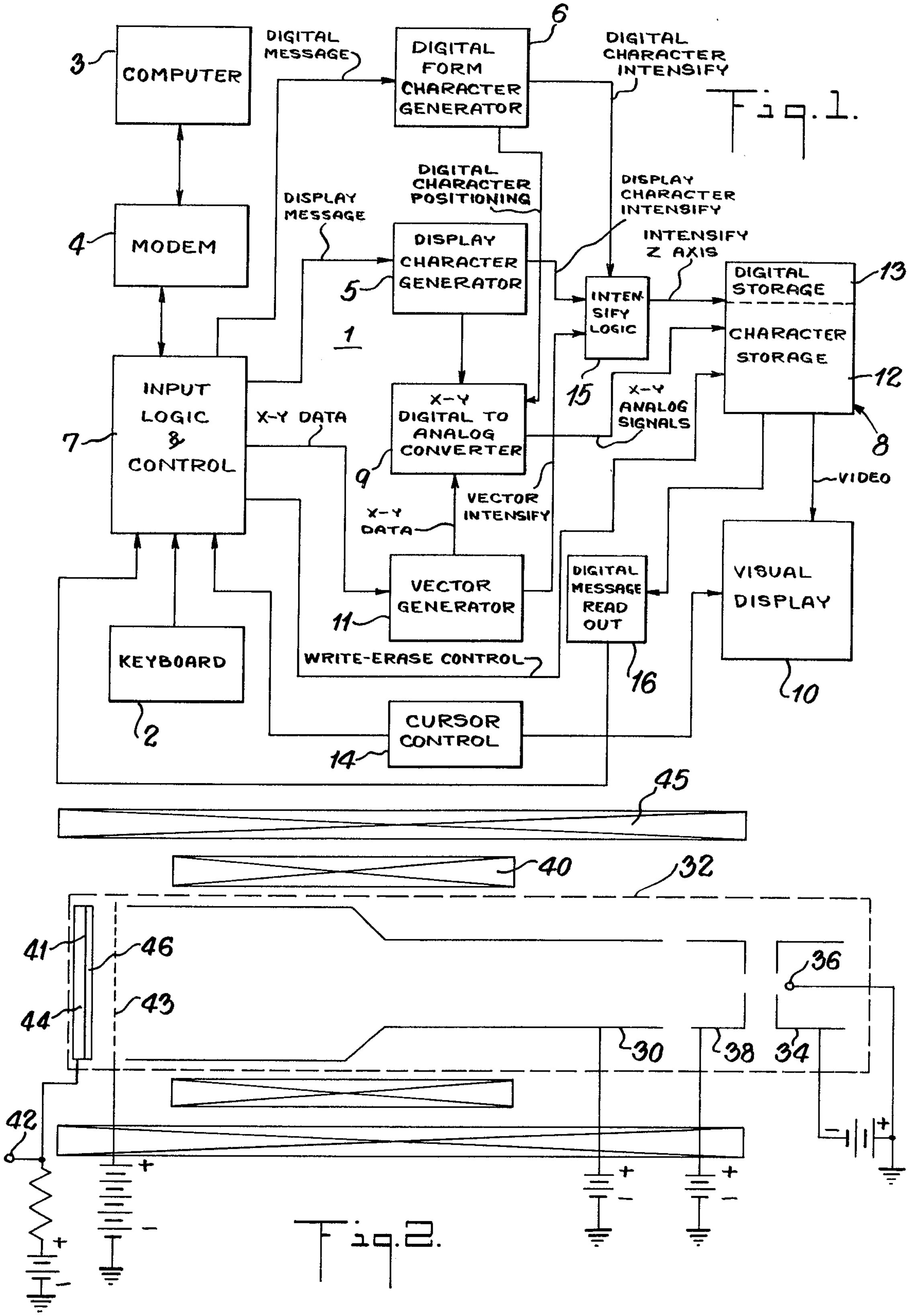
FIG. 1 is a block diagram schematically depicting an information storage and display system in accordance with the invention.
FIG. 2 is a cross-sectional view through the storage tube portion of the system.

In FIG. 1 a terminal 1 in accordance with the invention is shown, linked with a data source depicted as a computer 3. The terminal 1 is conveniently connected to computer 3 by, for example, telephone lines on a time shared basis. Computer 3 is seen to comprise a MODEM 4 which is an interface device which translates carrier telephone signals into digital electronic signals and vice versa, an input logic and control 7, a keyboard 2, a digital form character generator 6, a display character generator 5, an X-Y digital to analog converter 9, a vector generator 11, a cursor control 14 and a storage tube 8.

On command from keyboard 2, information from computer 3 is fed to MODEM 4 and then to input logic and control 7 which provides the programming for utilization of the original computer material. The input logic and control 7 provides the required signal data to digital form generator 6, display character generator 5, vector generator 11 and storage tube 8.

The digital form generator 6 transfers the digital data from the computer 3, as modified by the keyboard operator (if desired) to an intensify logic 15 and then to the off-screen target area 13 of storage tube 8. The display character generator 5 similarly transmits the alphanumeric data to on-screen target 12 of storage tube 8. Vector generator 11 and X-Y digital to analog converter 9 together cooperate to position the beam of storage tube 8 to place the alphanumeric data in the on-screen area 12 and the digital data in the off-screen area 13. The cursor control 14 serves to position the left margin and the vertical line during read out of the visual data.

The information stored on both the on-screen and off-screen areas is read out by means of the electron beam of the storage tube. The alphanumeric data is viewed on a visual display such as a cathode ray tube (CRT) 10 or a typewriter such as an I/O print out. The digital data is also read out by the electron beam of the storage tube and is transferred by digital message read out 16 to input logic and control 7. The read out digital data is usually returned to the computer for storage.

The storage tube incorporated into system 1 is designated generally at 8 in block form in FIG. 1. The division of block 8 into character configuration (on-screen) area 12 and character digital storage (off-screen) area 13, is intended to suggest the manner in which separate areas having these storage functions are established at the storage tube target face, a point that will become clearer in connection with the ensuing description of FIGS. 2 and 3.

In FIG. 2 a schematic cross-sectional view is shown through a storage tube that may be utilized with the terminal 1. This tube may correspond to the structure set forth in my earlier cited copending application, now U. S. Pat. No. 3,631,294, and may thus include an envelope 32, control grid 34, cathode 36, accelerating anode 38, wall anode 30, target 41 which comprises conductive substrate 44 and insulating mosaic layer 46, deflecting coil 45, focusing coil 40, output terminal 42 and declerating mesh 43. As is described in that copending application, writing is effected on storage areas of target 41 by utilizing the write signal (from display control 7) for X-Y deflection of the electron beam emitted by cathode 36 or by Z-axis modulation of a raster scanned beam (e.g., by applying the signal to grid 34). The read signal is a normal raster scan electron beam which is applied to said storage areas of the target. During reading of said storage areas, output current proportional to the charge pattern on the target is obtained at output terminal 42, which terminal corresponds to lines 14 and 15 in FIG. 1. In accordance with such correspondence it is clear from FIG. 1 that the output from terminal 42 is routed by display control 7 to visual display 10 or to digital data storage or configuration data storage portion of the target is being read out. Upon completion of the display process and/or transfer of data to storage means 9, erasure of the charge pattern stored in tube 8 can be brought about in the same manner as is described in my earlier cited copending application, i.e., by applying, for example, about +20 volts to target 41, setting grid 34 at approximately zero volts to yield maximum beam current and scanning the area to be erased.

Figure 3:
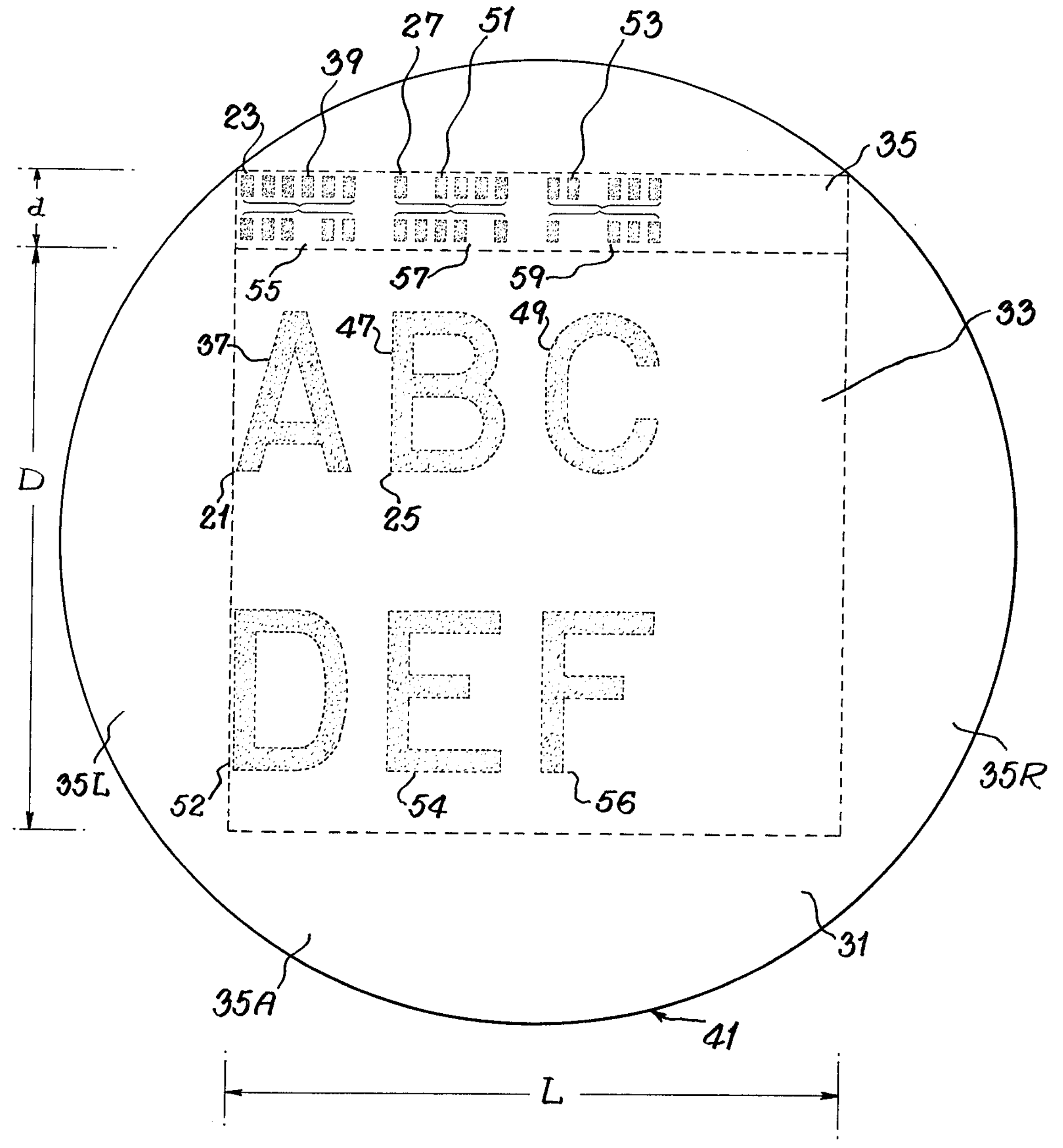
FIG. 3 is a plan view of the target portion of the storage tube.

The plan view of target 41, shown in FIG. 3, depicts the manner in which separate storage areas are established thereat. In particular, areas 33 (on-screen) and 35 (off-screen) are defined upon the target face 31, which are utilized respectively for storage of character configuration (on-screen) and character digital data (off-screen). In accordance with the invention, writing of data is effected in these allocated areas according to the nature of the data. More particularly, the operation of terminal 1 will be such that character data supplied by computer 3 for use in the systems will be indicative of a sequence of characters, which sequency may bear informational content and thus comprises a "message." The character data flowing from computer 3, however, will be translated into signals representing information of two distinct varieties: (1) data which may be used to directly write indicated character in common configuration form; and (2) digital data which bears a direct correlation to the common configuration data and represents a character by an encoded designation. In accordance with the invention, data of the first variety will be written at on-screen area 33 of the target, and data of the second variety will be written at off-screen area 35. Such translation of the data supplied by the computer is accomplished by a combination of the input logic and control 7 and the display character generator 5, the digital form generator 6 and the vector generator 11. Thus, upon receiving instructions from the computer 3 to the effect that a character 37 is to be placed at position 21, the input logic and control 7 will direct the display generator 5 and the vector generator 11 to operate the storage tube to generate and position that particular character at that particular position. The input logic and control 7 is programmed to also direct, without further instruction from the computer, the digital form generator 6 and the vector generator 11 to operate the storage tube to place a digital representation 39, corresponding to character 37, at a position 23. Since the storage tube has only one electron beam, the input logic and control 7 directs operation of the display generator 5 and the digital form generator 6 in a sequence which will allow both the character 37 and the corresponding digital representation 39 thereof to be written on the target face 31, in sequence, by the same electron beam. In this manner, the input logic and control 7 operates in a "message identical" mode in that it will automatically direct the creation of a sequence of data of the second variety at off-screen area 35 which corresponds directly to the sequence of data of the first variety written at the on-screen area. Alternately, the input logic and control 7 may be programmed to direct the digital form generator 6 and vector generator 11 to place data of the second variety at a given location only upon direct command of the computer 3, rather than allowing automatic generation and placement of digital representation for each character. In either mode, the input logic and control 7 accepts and interprets information from the computer 3 and translates the information into directions to the generators 5, 6 and 11 which will control the storage tube such that the desired information will be written upon the target 41.

The variety (1) data is, of course, such as can thereafter be used via readout to provide a signal suitable, for example, for modulating a CRT raster display to thereby yield a visible, luminous display of the character. In practice, this is accomplished by raster scanning the character to be read out, and applying the resultant read out to modulation of a synchronized raster scan at the CRT display. The characters written at area 33 are therefore in the precise configuration of the character to be displayed; they are, so to speak, in "common" form. Such a character is suggested at 37 as constituting a pattern of negative charge deposited on face 31 in the shape of an A.

That data designated as variety (2), above, is shown as a sequence of a few to several bits indicative, in some selected code, of the character. Assuming, for example, that one desires to write the same letter A in digital form in area 35, it may only be necessary to write, say, six bits to represent the character. Such a writing is representatively shown at 39.

In accordance with a preferred embodiment of the invention, the areas 33 and 35 will actually have shapes as suggested in FIG. 3. In particular, on-screen area 33 will preferably be relatively large and rectangular in shape, with off-screen area 35 abounding area 33 and positioned above and being of approximately the same dimension L but of much reduced depth *d* in comparison to the depth D of the area 33. To obtain the maximum use of the on-screen area 33 for readout and transfer for visual display, area 35 preferably occupies the upper perimetric segment of the target face and in the circular target face of the figure is within a chordal segment. It is also within the contemplation of the invention to use lower perimetric segment 35A as the off-screen, storage area alone or in combination with storage area 35. When area 35 and area 35A serve as the off-screen storage areas, there is a direct correlation in the vertical positioning of the electron beam for the storing and readout of the on-screen and off-screen information. Similarly, side areas 35R and 35L, which are also perimetric segments, may also be used as off-screen storage areas. In such cases, the direct correlation between the stored alphanumeric data and the stored digital data is horizontal rather than vertical. The on-screen and off-screen areas may also be formed of other shapes than those illustrated.

Preferably, the off-screen writing is on area 35. The following discussion relates to such a condition. The advantages of having a spatial arrangement as depicted derives from the great simplicity with which character, and particularly sequences of characters arranged into messages may be written in direct correlation in the two areas. In particular it will be observed that if we regard the target face 31 as residing in an X-Y plane, then the coordinates for writing the same letter in common and in digital form, have the same X-value. Looking at the letter B and its initial positioning point 25, and assuming that the digital equivalent thereof is written at 51, we see that the positioning point 27 again can be chosen to have the same X coordinate as the B. It is thus evident that the digital representations 39, 51, 53 and 55, 57 and 59 corresponding to characters 37, 47, 49, 52, 54 and 56, may by the present arrangement of areas be positioned using the same X-deflection voltage as that associated with the corresponding common character, and using a Y-deflection voltage representing that used for the common form character reduced by a fixed factor (e.g., reduced to perhaps one-tenth that of the original value). Such a technique vastly reduces the complexity required in the system, in that the positioning coordinates for digital equivalents of written common characters can be obtained by a very slight manipulation of the held initial positioning voltages specified by computer 3 for the common form of the same character. It may also be observed that by writing first the character at 37, and then its digital equivalent at 23, and so on for the other characters and digital equivalents, the end result is a digitally encoded message in area 35 in direct correlation (order of characters, etc.) with the "fully" composed message in area 33. Accordingly, readout of either area can be effected by sequentially reading the characters in the order written therein.

While, as indicated, there is great advantage in arranging the digital data and configuration data storage areas as in FIG. 3, it will be appreciated that other arrangements for these areas are suitable. The areas need not, for example, be contiguous and can be shaped other than in the forms shown.

Returning to FIG. 1, it is seen that data read out from character digital storage 13 is fed to digital message r read out 16. This process is carried out under direction of input logic and control 7. Responsive again to input logic display control 7 may also be read out from character storage 12 and fed to visual display 10. Such display has been exemplarily cited as constituting CRT display apparatus, in which instance—as previously set forth—the readout signals are used to modulate a CRT display, but other devices can be used to convert to visually acceptable form, such as, for example, a CRT adapted to write on a sensitized paper, or various electro-optical panels or the like.

While the present invention has been particularly described in terms of specific embodiments thereof, it is apparent to those skilled in the art that numerous modifications are possible without departing from the spirit of the invention and the scope of the subjoined claims.

The embodiments of the invention in which an exclusive property or privilege is claimed are defined as follows:

1. A storage and display system for alphanumeric information or the like comprising:

a storage tube having an on-screen target area for storing character configuration data of alphanumeric characters in common form and an off-screen target area for storing character data of alphanumeric characters in digital form;

means for writing said character configuration data in common form on the on-screen target area and for writing said character data in digital form on the off-screen target area in direct correlation with the character configuration in common form;

character configuration data utilization means;

character digital data utilization means;

means for reading out stored information from the on-screen area or the off-screen area and transferring said read out signal respectively to the character configuration data utilization means or the character digital data utilization means, respectively.

2. Apparatus in accordance with claim 1 wherein said digital data utilization means comprises a storage means for said data.

3. Apparatus in accordance with claim 1 wherein said configuration data utilization means include a CRT for displaying said characters represented by said data.

4. Apparatus in accordance with claim 1 wherein said on-screen area is rectangular in shape and the off-screen area is a perimetric segment contiguous with the on-screen area.

5. Apparatus in accordance with claim 4 wherein said writing means includes means for positioning the electron beam at a selected location for writing said character in common form in the on-screen target area and means for thereafter reducing by a fixed factor the positioning deflection voltages along the coordinate direction between the said storage areas, to thereby position the said beam for writing the same character in digital form in the off-screen target area.

6. A method for using a storage tube in a display system including CRT display means and digital data utilization means, comprising:

assigning separate on-screen and off-screen areas on the target of said storage tube for storage of character configuration in common form and character digital data in digital form;

writing characters onto said tube target in common form at said on-screen area and in digitally encoded form at said off-screen area;

reading out said on-screen area and utilizing said readout to modulate a scan raster at said CRT to visualize said characters; and reading out said digital data from said off-screen area and transferring said data to said digital data utilization means.

7. A method in accordance with claim 6 wherein said characters are written in direct correlation on said on-screen and off-screen areas.

8. A method in accordance with claim 7 wherein said characters are positioned for writing in said off-screen area by utilizing the pair of deflection voltages used to position said characters in said on-screen area, reduced in one deflection direction by a fixed factor.

* * * * *